(12) United States Patent
Biegelsen et al.

(10) Patent No.: US 6,284,352 B1
(45) Date of Patent: Sep. 4, 2001

(54) FERROFLUIDIC ELECTRIC PAPER

(75) Inventors: David Kalman Biegelsen, Portola Valley; Warren Bruce Jackson, San Francisco, both of CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/216,829

(22) Filed: Dec. 21, 1998

(51) Int. Cl.[7] .................. B32B 31/04; B32B 33/00; B41M 5/20
(52) U.S. Cl. .................. 428/207; 101/130; 101/489; 156/62; 156/145; 156/256; 156/272.4; 156/277; 345/84; 345/107; 428/211; 428/317.9; 428/321.1; 428/900
(58) Field of Search .................. 428/207, 211, 428/317.9, 321.1, 900; 101/130, 489; 345/84, 107; 156/62, 145, 256, 272.4, 277

(56) References Cited

U.S. PATENT DOCUMENTS

| 3,648,269 | 3/1972 | Rosenweig et al. . |
| 3,812,490 | 5/1974 | Goodrich . |
| 3,863,249 | 1/1975 | Olah . |
| 3,935,571 | 1/1976 | Sargent . |
| 3,972,595 | 8/1976 | Romankiw et al. . |
| 4,583,824 | 4/1986 | Lea . |
| 5,389,945 | * 2/1995 | Sheridon .................. 345/85 |
| 5,670,078 | 9/1997 | Ziolo . |
| 5,717,283 | 2/1998 | Biegelsen et al. . |
| 5,723,204 | 3/1998 | Stefik . |
| 5,731,792 | 3/1998 | Sheridon . |
| 6,038,059 | * 3/2000 | Silverman .................. 359/296 |

FOREIGN PATENT DOCUMENTS

| 633 488 A | 1/1995 | (EP) . |
| 884 714 A2 | 12/1998 | (EP) . |

* cited by examiner

*Primary Examiner*—Blaine Copenheaver
(74) *Attorney, Agent, or Firm*—Oliff & Berridge, PLC

(57) ABSTRACT

A low cost, reusable electric paper that uses ferrofluidic colored fluids and an external magnetic writing instrument. The paper can be formed from laminated rolls of polymeric media that are roller die cut, inked, aligned, bonded and cut to an appropriate size. The paper is formed from layers that define a hidden reservoir and a visible reservoir for each of an array of print cells that form a grid on the paper. A ferrofluidic coloring fluid is permanently contained within the paper and can move from the hidden reservoir to the visible reservoir. The size of the cells define the resolution of the paper. Initially, the paper appears white. However, after passing a writing instrument, such as a stylus, over desired print cells, these cells switch from a first hidden bistable state to a second visible bistable state. In the second visible bistable state, the ferrofluidic coloring fluid forms a desired image in a desired color or colors.

32 Claims, 8 Drawing Sheets

FERROFLUIDIC ELECTRIC PAPER

BACKGROUND OF THE INVENTION

1. Field of Invention

The invention relates to low cost, reusable electric paper that uses a colored ferrofluidic fluid and is activated by an external magnetic writing instrument.

2. Description of Related Art

Reusable electric paper is described in U.S. Pat. Nos. 5,717,283 to Biegelsen, 5,723,204 to Stefik and 5,731,792 to Sheridon, all of which are incorporated herein by reference in their entirety. The 283 patent uses dielectric liquid in an array of hourglass-shaped pores. External electric fields move the liquid ink bistably from one volume to the other. See prior art FIG. 11. The 204 patent uses black and white spheres encapsulated in a liquid and embedded in a substrate. The spheres are responsive to an electrical field. The 792 patent uses encapsulated colored polar liquid and an electrode array embedded within a substrate to force the liquid to selected reservoirs to create an image on the substrate.

SUMMARY OF THE INVENTION

The invention provides a low cost electric paper that uses ferrofluidic colored fluids and an external magnetic writing instrument. The paper can be formed from laminated rolls of polymeric media that are roller die cut, inked, aligned, bonded and cut to an appropriate size. The paper uses a simple, hidden ink that is permanently contained within the paper in a plurality of cells, which form a grid on the paper. The size of the cells define the resolution of the paper.

Initially, the paper appears white. To write on the electric paper according to the invention, a writing head, such as a stylus, is passed over some of the cells. In response, these cells switch from a first hidden bistable state to a second bistable state. In the second bistable state, the ink is visible and forms a desired image in a desired color or colors.

BRIEF DESCRIPTION OF THE DRAWINGS

Reference will be made to the drawings wherein like numerals refer to like elements and wherein.

DETAILED DESCRIPTION OF PREFERRED EMBODIMENTS

Figure 1:
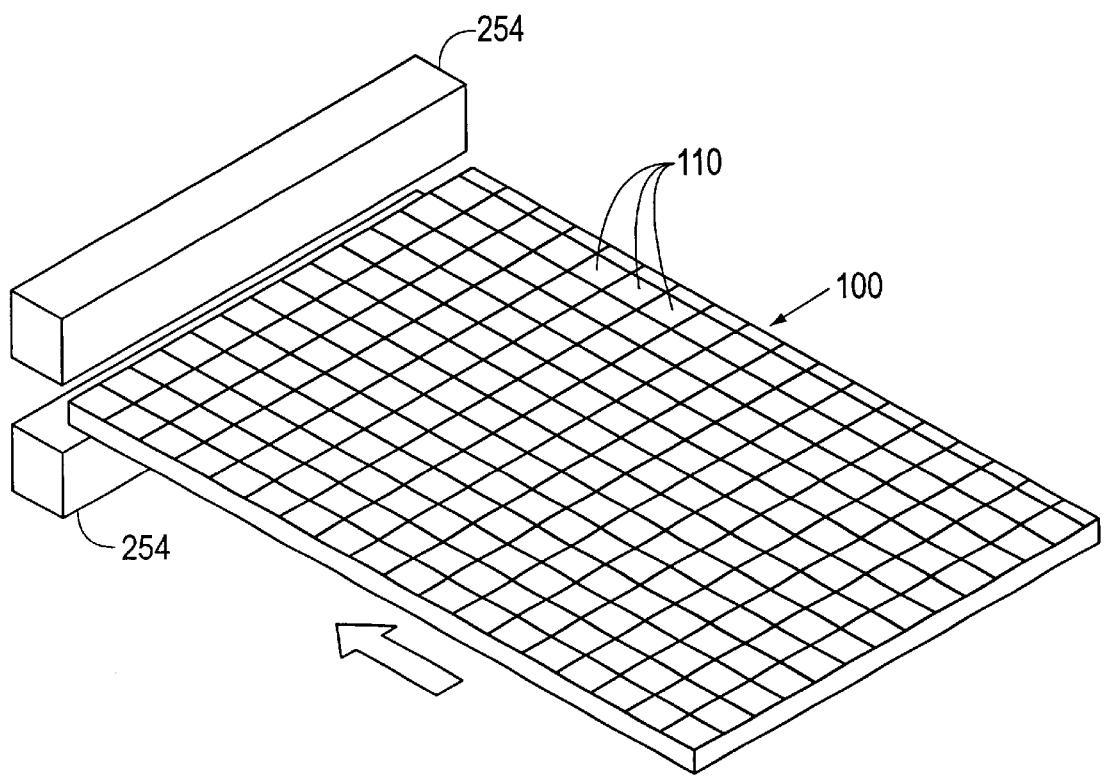
FIG. 1 is a perspective view of the electric paper passing through a magnetic writing head array.
Figure 2:
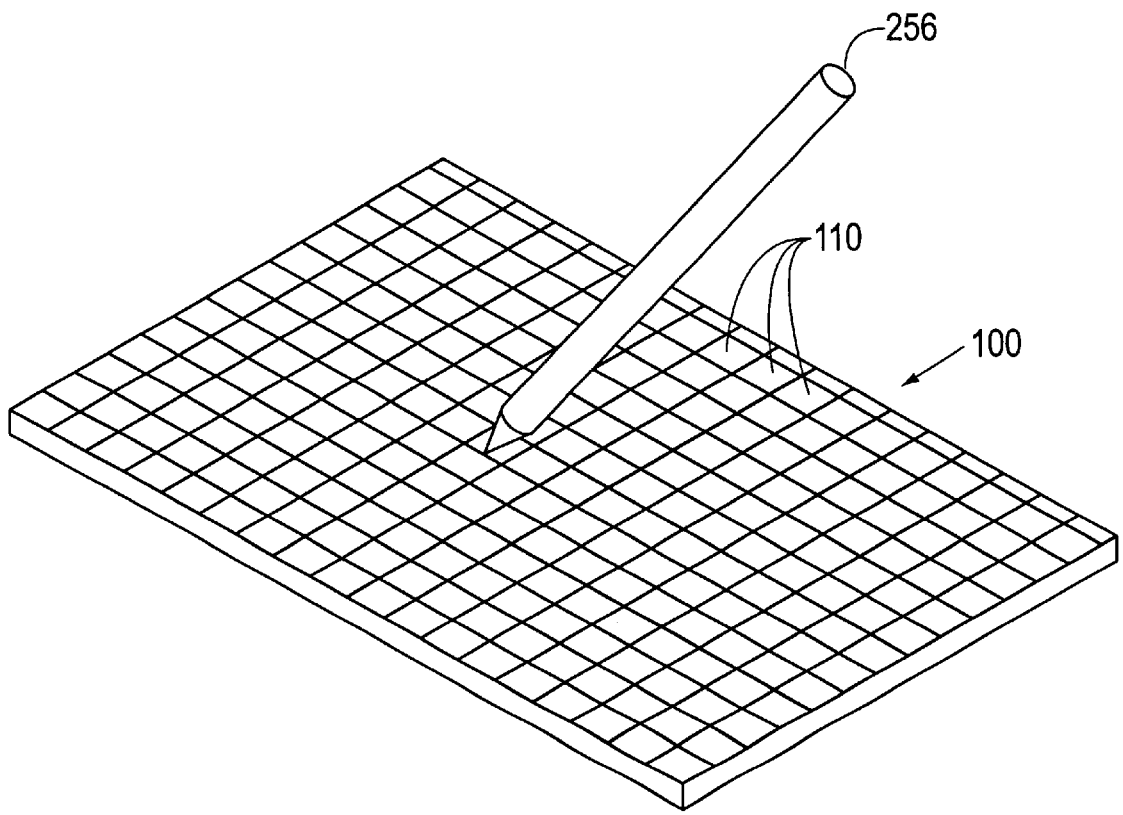
FIG. 2 is a perspective view of the electric paper being written on by a hand-held magnetic writing stylus.
Figure 11:
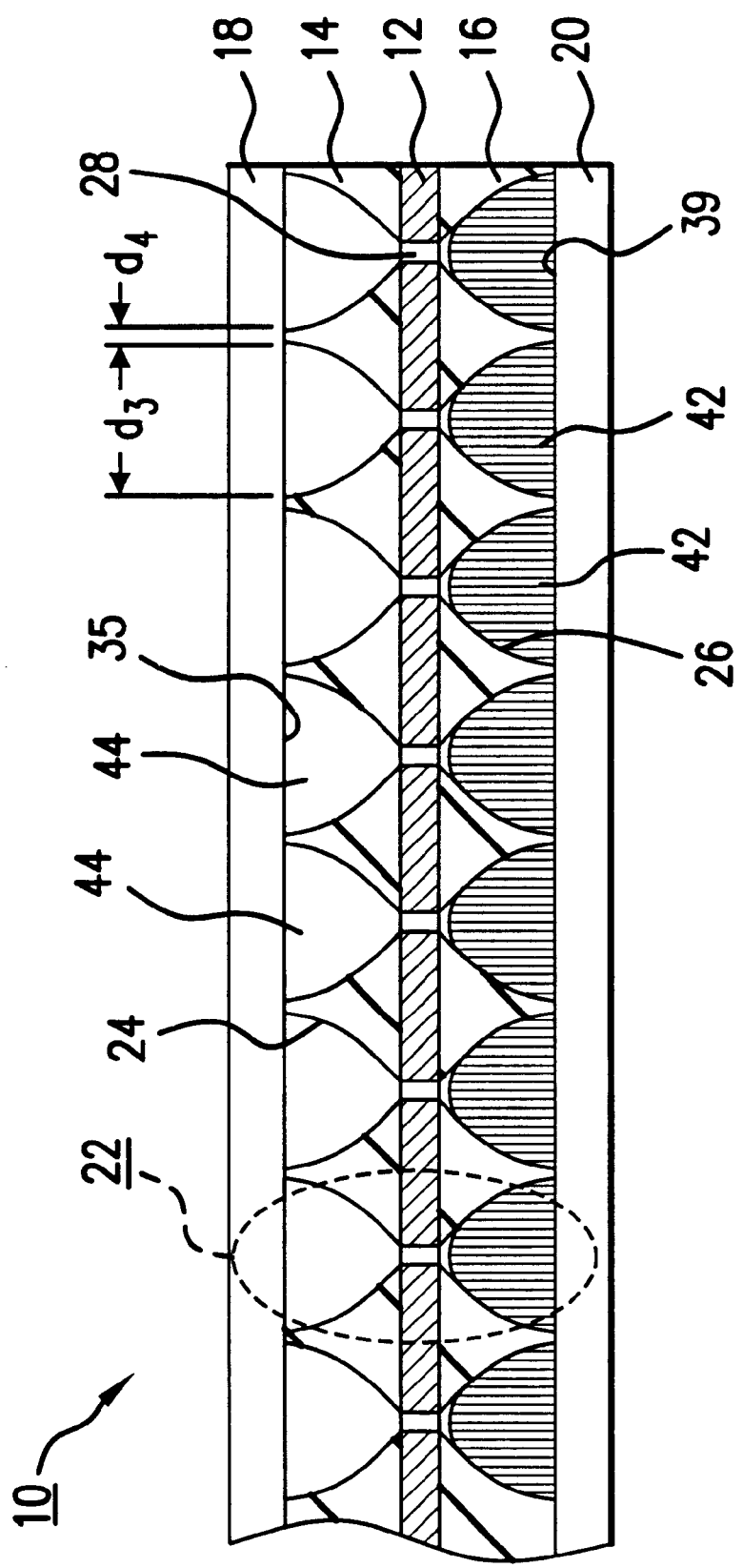
FIG. 11 is a cross-sectional view of a known electric display sheet.

With reference to FIGS. 1 and 2, a sheet of reusable electric paper 100 is made up of a matrix of independent print cells 110, which define the resolution of the paper. The sheet shown in FIGS. 1 and 2 is meant to be illustrative and in actuality would comprise print cells 110 of a much smaller size. It is contemplated that cells could be on the order of 50 cells per inch (cpi) to 300 cpi, or other desirable sizes. A cell with generic topology is shown in FIG. 11. In the present application the electric paper 100 is preferably formed from several laminated layers, as better illustrated and described with reference to FIGS. 3–6.

Figure 4:
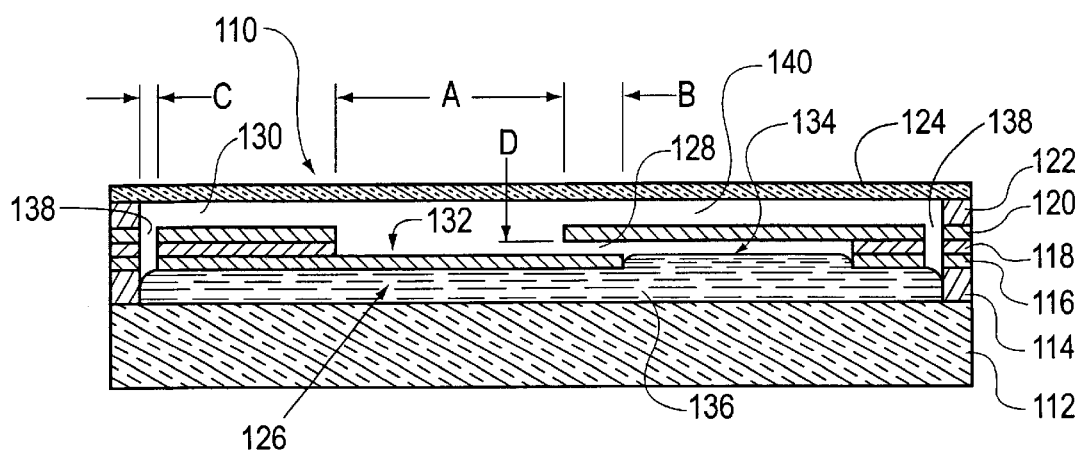
FIG. 4 is a cross-sectional view of a print cell of an electric paper taken along line 4—4 of FIG. 3 according to a first embodiment of the invention.
Figure 3:
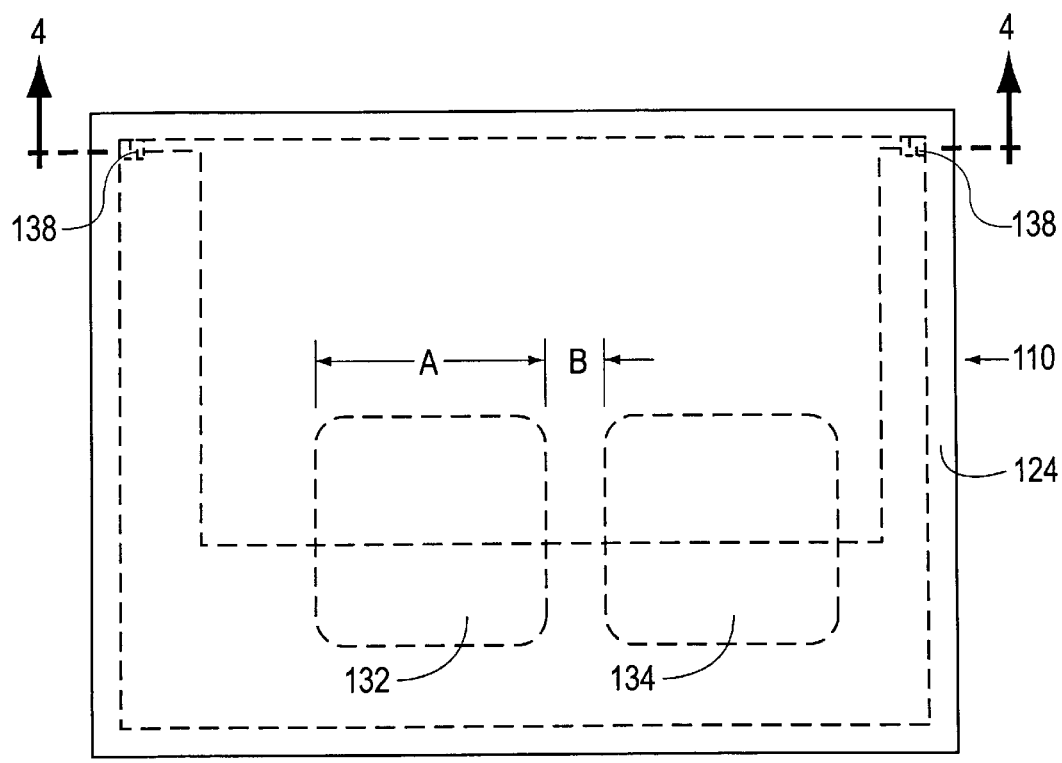
FIG. 3 is a top view of a first exemplary embodiment of a print cell of the electric paper according to the invention, where the cell is in a first bistable state.

FIG. 3 shows a first exemplary embodiment of a print cell 110 in a first bistable state. FIG. 4 shows a cross-sectional view of an individual print cell 110 of electric paper 100 taken along line 4—4 of FIG. 3. In this first embodiment, the electric paper 100 is made up of at least seven layers: a bottom substrate 112, a first intermediate layer 114 that forms walls for a hidden lower reservoir 126, a second intermediate layer 116 that forms a top layer for the lower reservoir 126, a third intermediate layer 118 that defines a thickness of a passageway 128, a fourth intermediate layer 120 that defines a bottom of a viewable upper reservoir 130, a fifth intermediate layer 122 that forms walls for the upper reservoir 130, and a top transparent cover layer 124.

A lower aperture 134 is defined in the second and third intermediate layers 116 and 118. An upper aperture 132 is defined in the third and fourth intermediate layers 118 and 120. The upper aperture 132 and the lower aperture 134 have a length A that is larger than the thickness D of the passageway 128. Thus, the passageway controls passage of a ferrofluidic coloring fluid 136 between the upper reservoir 130 and the lower reservoir 126. Initially, the ferrofluidic coloring fluid 136, such as the ferrofluidic ink used in U.S. Pat. No. 5,670,078 to Ziolo, is provided in the lower reservoir 126. One or more return passageways 138 can also be provided along one or more peripheral edges or corners of the cell 110, or in other areas of the cell 110. The ferrofluidic coloring fluid 136 has a color that contrasts with the color of the intermediate layers 116, 118, 120 and 122. In this first exemplary embodiment, the ferrofluidic coloring fluid 136 is a non-transparent and non-white color, such as black.

The bottom substrate 112 forms a carrier layer that is preferably opaque, and more preferably white. The bottom substrate 112, the intermediate layer 114 and the intermediate layer 116 define the boundaries and dimensions of the hidden lower reservoir 126. The upper reservoir 130 is formed by the intermediate layers 118 and 120 and the transparent cover layer 124. The volume of the lower reservoir 126 needs to be at least as large as the volume of the upper reservoir 130. The volume of the lower reservoir is primarily controlled by the thickness of the intermediate layer 114. Each layer is 1–2 mils thick. For 200 cpi, the lateral pitch is ~5 mils.

As shown in FIGS. 3–6, the ferrofluidic coloring fluid 136 is retained in a first bistable state, or hidden state, in the lower reservoir 126 by the surface tension constraints of the ferrofluidic coloring fluid 136, as well as by gravity. FIG. 3 shows a top view through the transparent cover 124 in this state. The intermediate layers 116, 120 and 122 are also preferably an opaque white. The upper reservoir 130 is filled with a suitable transparent medium 140, either a gas, such as air, or a liquid, such as a transparent fluid that is immiscible with ferrofluidic coloring fluid 136. Accordingly, in this first bistable state, all that would be seen is white, with the ferrofluidic coloring fluid 136 being completely hidden from view in all but the return passageways 138, which have a length C that is negligible in size so far as perceived color is concerned. This is because the upper aperture 132 is offset from the lower reservoir 134 by a distance B. Preferably, each print cell 110 of the sheet of electric paper 100 is initially in this "blank" state, so that the sheet of electric paper 100 appears blank (white).

Upon application of a suitable magnetic force applied to the transparent cover layer 124 of the sheet of electric paper 100, magnetic particles embedded in the ferrofluidic coloring fluid 136 cause the ferrofluidic coloring fluid 136 to travel from the lower reservoir 126 to the visible upper reservoir 130. This can be achieved by a bar array of individually addressable magnetic elements, as shown in FIG. 1, by a hand-held magnetic wand, as shown in FIG. 2, or other magnetic writing instruments, as discussed below. When the ferrofluidic coloring fluid 136 is drawn into the upper reservoir 130, the transparent medium 140 is displaced into the lower reservoir 126, such as through the passageways 138.

Figure 6:
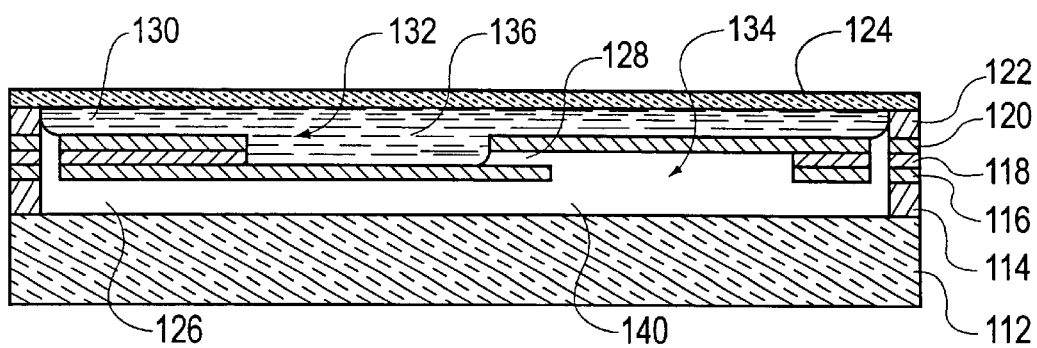
FIG. 6 is a cross-sectional view of the print cell of an electric paper taken along line 6—6.
Figure 5:
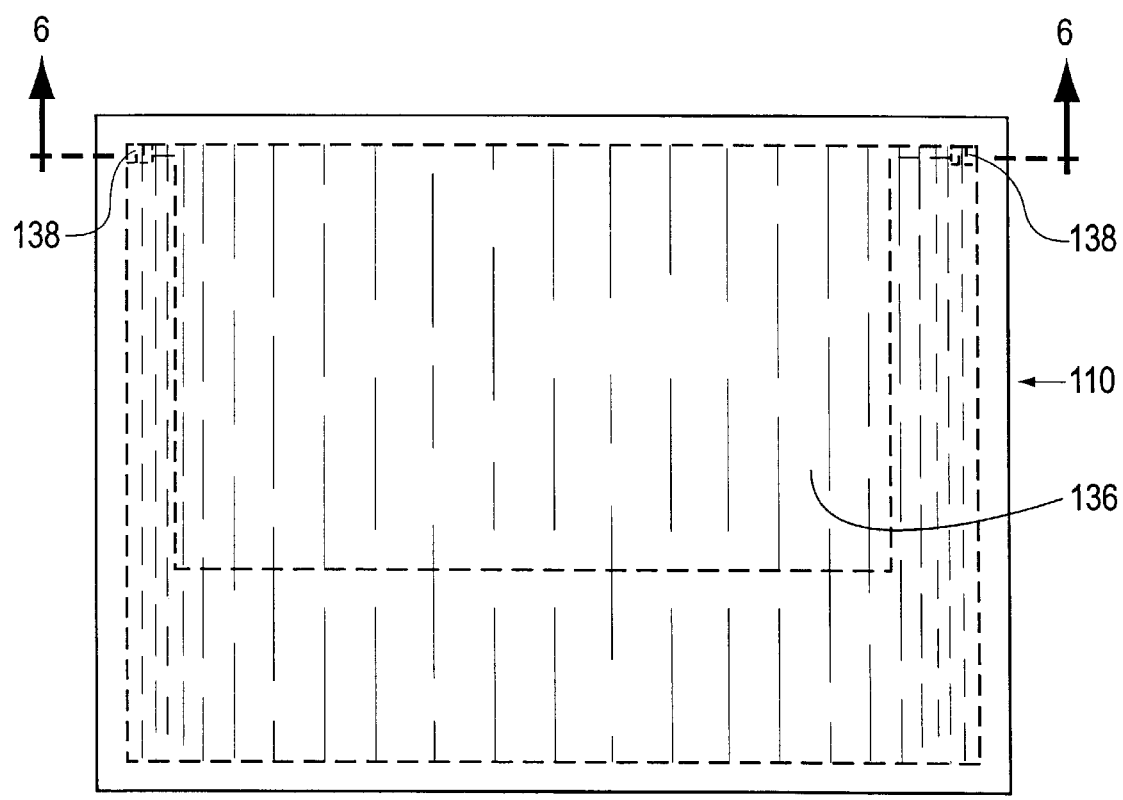
FIG. 5 is a top view of the print cell of the electric paper of FIG. 3 in a second bistable state (black)

The upper reservoir 130 is sized so that substantially the entire viewing surface of the upper reservoir 130 is filled with the ferrofluidic coloring fluid 136, as shown in FIGS. 5 and 6. Additionally, by controlling the passageways 138 and 128, this position can be retained even upon removal of the magnetic source due to the surface tension properties of the ferrofluidic coloring fluid 136. In particular, the ferrofluidic coloring fluid 136 is selected to have a sufficient surface tension and/or viscosity that provides a suitable compromise between flowability and stability. The passageways 138 and 128 are sized so that surface tension and/or viscosity of the ferrofluidic coloring fluid 136 resists flowing back through the passageways 138 and 128 into the hidden lower reservoir 126. In particular, thickness D of the passageway 128 is controlled based on the surface tension and/or viscosity of the ferrofluidic coloring fluid 136 so that absent an external force, the ferrofluidic coloring fluid 136 will not flow through passageway 128 towards the hidden lower reservoir 126. Thus, it takes an external force to overcome the surface tension and cause flow of the ferrofluidic coloring fluid 136 to flow through the passageways 138 and 128 between the lower and upper reservoirs 126 and 130. Accordingly, a second bistable state can be attained in which the ferrofluidic coloring fluid 136 remains in the upper reservoir 130. In this second bistable state, the viewable state, the print cell 110 appears colored.

The ferrofluidic electric paper according to the invention can retain its "printed" state nearly indefinitely. Moreover, no electrical or magnetic elements are necessary to retain the print cells 110 in a desired state.

Figure 7:
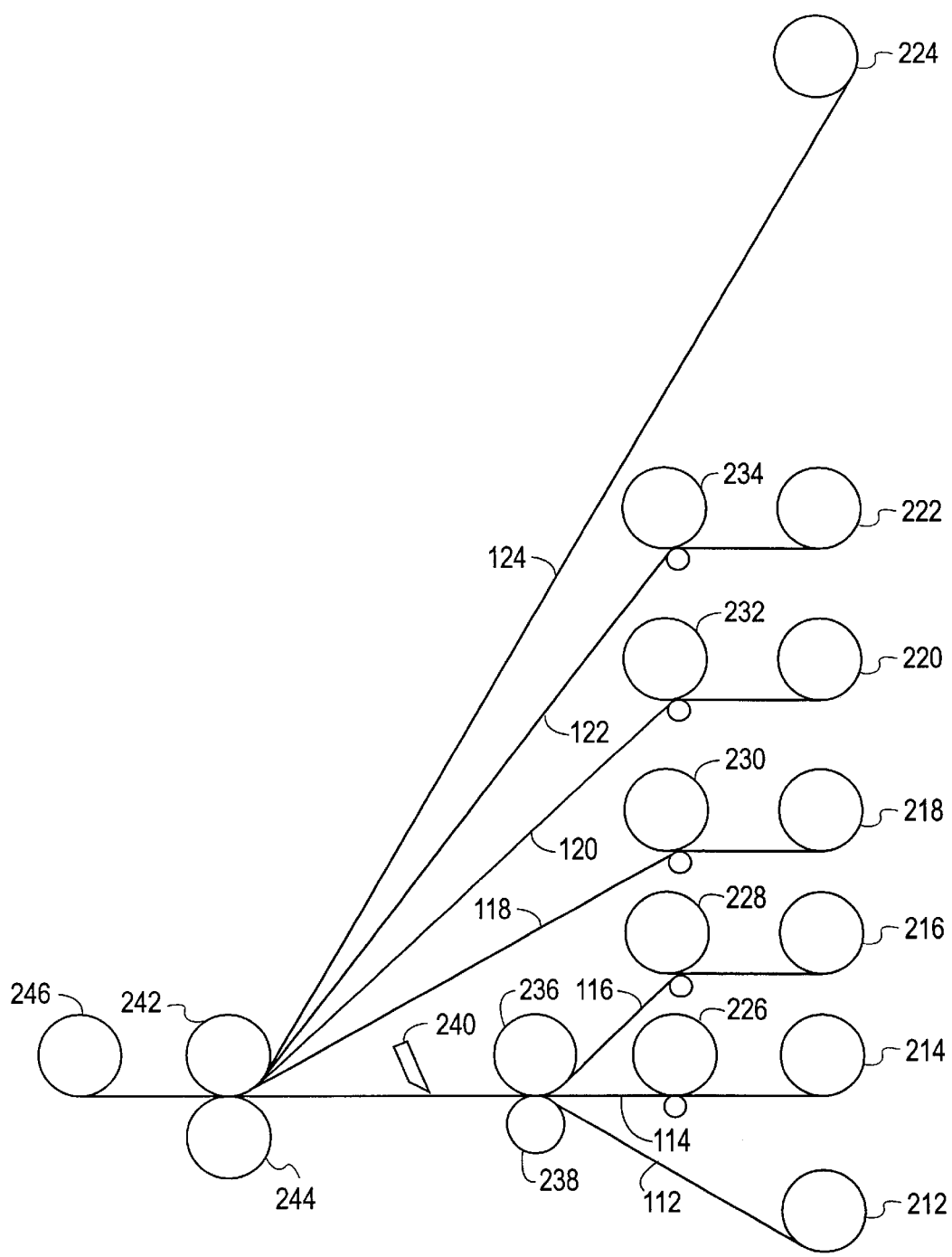
FIG. 7 is a side view of a first exemplary embodiment of a manufacturing assembly station for forming the electric paper according to this invention.
Figure 8:
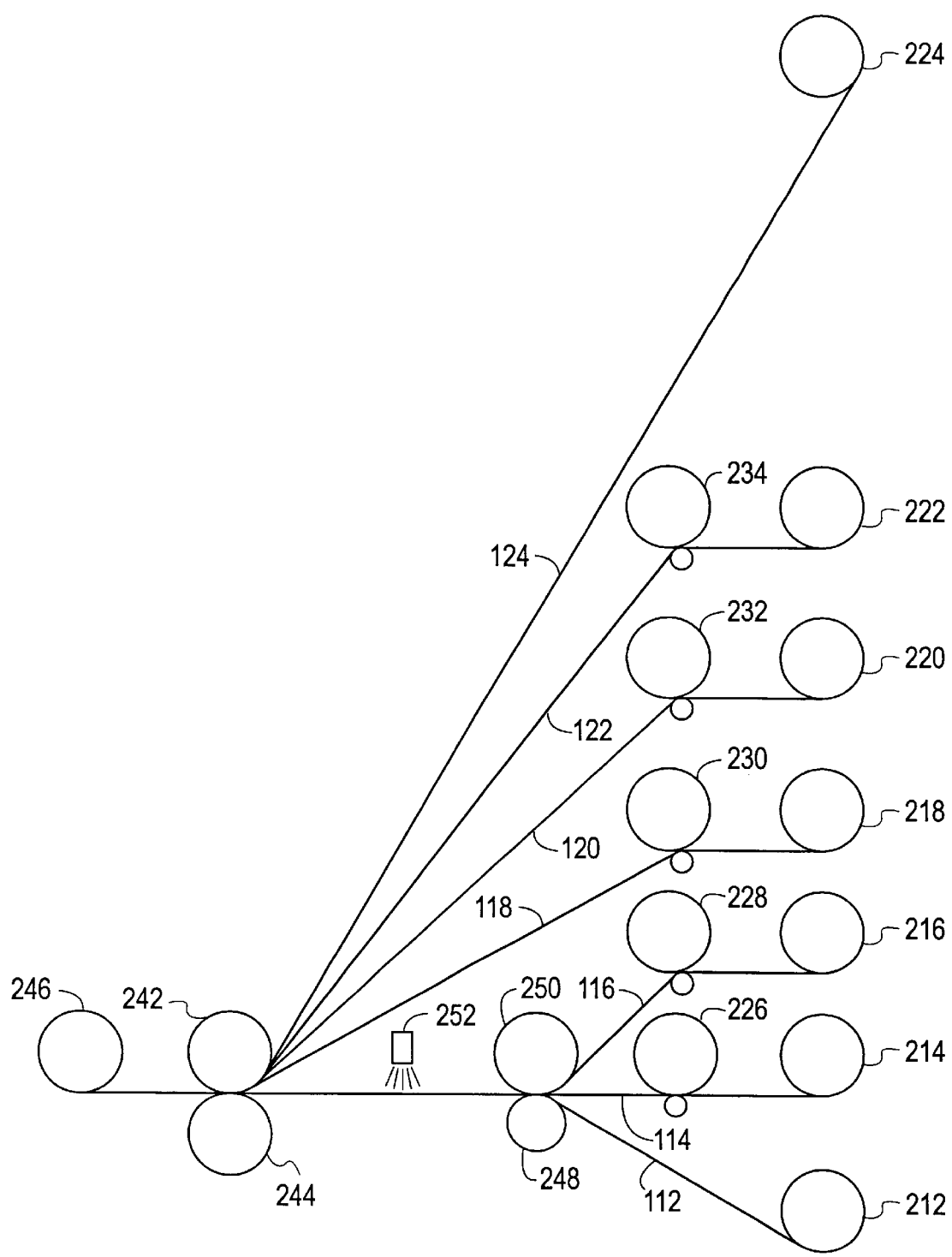
FIG. 8 is a side view of a second exemplary embodiment of a manufacturing assembly station for forming the electric paper according to the invention.

A suitable material for the base substrate 112 would be mechanically strong and resistant to the ferrofluidic coloring fluid 136. Examples of suitable materials for the base substrate 112 are polyimide, polyester and polyethylene filled with TiO2 at 20% by weight, or teflon. The intermediate layers 114, 116, 118, 120, and 122 can each be formed from any suitable polymeric or adhesive material. These layers should resist the ferrofluidic coloring fluid 136 and be capable of readily bonding with adjacent layers. Intermediate layers 116, 120 and 122 also should be opaque white, or more generally opaque and the color of the semi-rigid base substrate 12 and may be tear-resistant. A suitable layer material is TiO2-loaded or coated polyethylene or polyester, such as NeverTear. The top transparent cover layer 124 needs to be transparent and can be made of glass or polymer, such as Mylar, plexiglass or Polyethylene Terephthalate (PET), for example. These layers can be bonded to each other by a suitable contact or thermocompression adhesive or solvent bonding method. Layers 114, 118, and 120 can be 1 mil thick dry film adhesive films. It should also be appreciated that additional layers as desired can be placed between any of the layers 112–124. FIGS. 7 and 8 show one exemplary method and one exemplary apparatus for forming the electric paper according to the invention. In FIG. 7, each of the layers 112–124 of the ferrofluidic electric paper 100 can be initially formed from a roll of media located on rolls 212, 214, 216, 218, 220, 222, and 224, respectively. Each roll of media may include a backing substrate and the layer that forms the electric paper 100. The intermediate layers do not include solid layers, so die cutters pairs 226, 228, 230, 232, and 234 are provided to die cut the intermediate layer 114–122, respectively, to the appropriate shapes. Alternatively the rolls may be precut and wound on rolls 212, 214, 216, 218, 220, 222, and 224. The die cutters can be roller die cutters or equivalent laser cutting apparatus.

The base substrate layer 112 is fed from the roll 212. At approximately the same time, the intermediate layers 114 and 116 are fed from rolls 214 and 216, respectively. The intermediate layers 114 and 116 first pass through the respective roller die cutters 226 and 228 to cut desired shapes out of the intermediate layers 114 and 116. Depending on the properties of the selected layers, lamination of the layers to each other can be performed by heat bonding, pressure bonding, U.V. curable or other adhesives or any other conventional or later developed bonding technique.

After the intermediate layers 114 and 116 are die cut, the base layer 112 and intermediate layers 114 and 116 are fed through an inking roll pair 236 and 238. Layer 116 (and 118) are preferably non-wetting surfaces relative to the selected ferromagnetic ink. This forms and fills the lower reservoir 124. The inking roll 236 carries a suitable ferrofluidic coloring fluid 136. Accordingly, the inking roll pair 236 and 238 can serve to laminate these layers as well as fill the lower reservoir 126 with the ferrofluidic coloring fluid 136. A doctor blade 240 located downstream in the process direction of the apparatus can wipe off excess ferrofluidic coloring fluid 136 prior to entering a final lamination roll pair 242 and 244.

Additional rolls or structure can be provided to remove the backing layer from each layer prior to lamination. Such structure is conventional and thus need not be discussed.

At the same time the lower reservoir 126 is being formed, the intermediate layers 118, 120, 122 and the transparent cover layer 24 are fed from their respective rolls toward the final lamination roll pair 242 and 244. Die cutters 230, 232 and 234 die cut the intermediate layers 118, 120 and 122, respectively. Then, the intermediate layers 118, 120, 122 and the transparent cover layer 124 are fed to the final lamination roll pair 242 and 244.

At the final lamination roll pair 242 and 244, all of the layers 112–124 are laminated together to form a continuous roll of the ferrofluidic electric paper 100 according to the invention. The continuous roll of the ferrofluidic electric paper can be wound onto a take up roll 246. Alternatively, a cutter could be provided to cut the continuous roll of the ferrofluidic electric paper 100 into discrete sheets of an appropriate size, such as "8½×11" or A4. Such a cutter could be another die cutter or a laser cutter. The intermediate layers 118, 120, and 122 and the transparent cover layer 124 also have their backing layer removed prior to final lamination with the other layers 112–116. Alternatively, the ferrofluidic electric paper 100 could be built up by individually laminating a subsequent layer onto or even prior lower layers and the backing layer could be removed after lamination of that subsequent layer.

After final lamination, the various print cells 110 are formed and sealed from one another. As stated above, various method of lamination can be used depending on the particular materials used. The films and adhesive materials are well known to those skilled in the lamination arts.

A variation of this exemplary embodiment of a method and apparatus for the ferrofluidic electric paper 100 is shown in FIG. 8, where like elements refer to like structure. The main difference between the exemplary embodiment shown in FIG. 7 and this exemplary embodiment is in the inking. Rather than using an inking roll pair 236 and 238 and a doctor blade 242, the apparatus shown in FIG. 8 includes a lamination roll pair 248 and 250. This lamination roll pair 248 and 250 serves to laminate the intermediate layers 112, 114 and 116 together to form the lower reservoir 126. Inking is achieved downstream by passing the formed lower reservoir 126 past a fullwidth marking array 252, such as an ink jet printer, that is activated to fill each lower reservoir 126 with the ferrofluidic coloring fluid 136. As in FIG. 7, final lamination takes place at the final lamination roll pair 242 and 244.

Other methods of assembly can be used. For example, inking could be performed further downstream, such that the intermediate layers 118, 120 or 122 may be laminated prior to inking. Inking may be achieved for monochrome displays by capillary uptake of the cells when brought into contact with an ink bath or donor roll. Alternatively a phase change ink layer could be used. The ink would form a solid layer at reduced temperatures and could be patterned on a carrier film by cutting or ink jet printing to fit within the reservoirs 126. After encapsulation the temperature could be increased to room temperature, causing the solid ink to change to a low viscosity liquid ink. It may even be possible to eliminate the inking step completely in the process, with inking being performed after formation of the sheets. This could be achieved by injecting ferrofluidic coloring fluid 136 by syringe or any other known or later developed method into the print cells 110.

Figure 10:
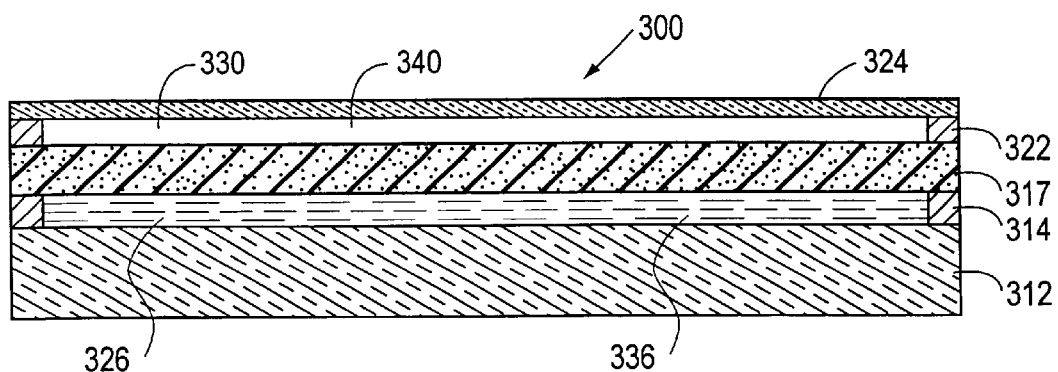
FIG. 10 is a cross-sectional view of a print cell of an electric paper taken along line 10—10 according to the second embodiment.
Figure 9:
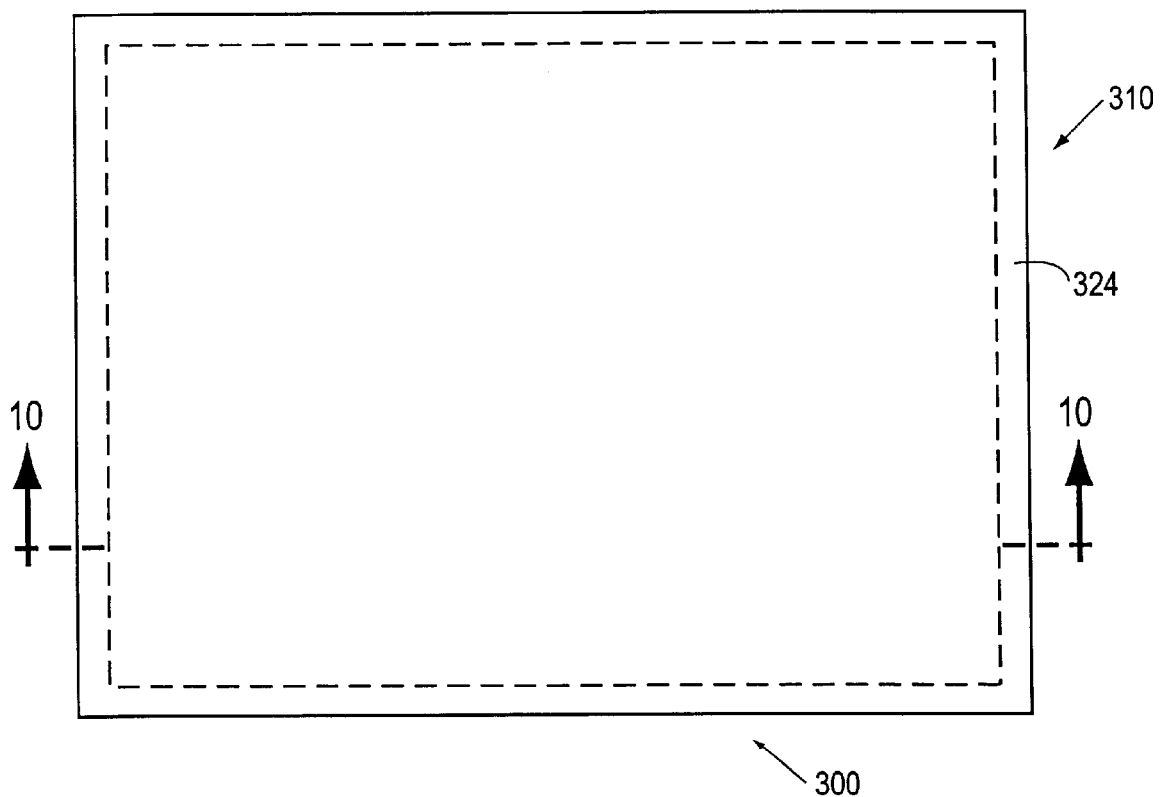
FIG. 9 is a top view of a second exemplary embodiment of the print cell of the electric paper where the cell is in a first bistable state.

FIGS. 9 and 10 show another exemplary embodiment of ferrofluidic electric paper 300 according to this invention. As shown in FIGS. 9 and 10, the ferrofluidic electric paper 300 includes five layers: base layer 312, intermediate layer 314, an intermediate sponge layer 317, an intermediate layer 322 and a transparent cover layer 324. The base layer 312, the intermediate layer 314 and the intermediate sponge layer 317 form the lower reservoir 326, while the intermediate sponge layer 317, the intermediate layer 322 and the transparent cover layer 324 form upper reservoir 330. The intermediate sponge layer 317 is made of a material that is white and porous, such that, in the first bistable state, the electric paper appears "blank." A suitable material for intermediate sponge layer 317 is a nucleopore filter (etched polycarbonate film) supplied by Poretics Corporation, Livermore, Calif.

As in the first exemplary embodiment, the ferrofluidic coloring fluid 336 is hidden from view when in the lower reservoir 326. Upon suitable magnetic actuation, on either the top transparent cover layer 324 or the base layer 312, the ferrofluidic coloring fluid 336 is attracted to the upper reservoir 330. Air or other gas 340 immiscible with the ferrofluidic coloring fluid 336 can initially fill the upper reservoir 330 and be displaced by the ferrofluidic coloring fluid 336. As in the first embodiment, the surface tension and/or the viscosity can be selected so that the two states are bistable. Accordingly, the surface tension and/or the viscosity is such that absent an external magnetic force, the ferrofluidic coloring fluid 336 will not flow back in to the lower reservoir 326.

In another exemplary embodiment, the reservoir layer 314 can be eliminated. As such, the lower reservoir 326 can be formed solely by the intermediate sponge layer 317. The ferrofluidic coloring fluid 336 can be hidden within the interstitial volume of the intermediate sponge layer 317 in the blank state. A non-wetting layer may be added to the top surface of the layer 317 in this case if the sponge layer is wetting.

The thus formed electric paper 100 or 300 according to any of these exemplary embodiments is bistable and the individual print cells 110 have their states changed by an external magnetic force. FIGS. 1 and 2 show two examples of a writing instrument that could achieve printing on such a sheet of the ferrofluidic electric paper 100 or 300.

In FIG. 1, a writing element 254 may be a fullwidth marking array having a magnetic head. For the physics of forces and pressures induced in ferrofluids see Ferrohydrodynamics, R. E. Rosensweig (Cambridge University Press, Cambridge, 1985.) The ferrofluidic electric paper 100 or 300 could be transported through the writing element 254 by any conventional or later developed paper transport within a printing apparatus. The fullwidth marking array would be provided with a magnetic pole arrangement for each pixel, or print cell, of the paper. When addressed by conventional addressing circuitry used in, for example ink jet or laser printheads, a current pulse creating a localized magnetic field will be generated for all addressed array components to generate a desired image on the ferrofluidic electric paper 100 when it passes through the writing element 254. Ferrofluid is pulled into the high magnetic field region when the field strength exceeds a threshold related to the cell structure, surface energies and magnetic and rheological parameters of the fluid. Thus, the localized magnetic field for each print cell 110 changes the print cell state from the first hidden bistable state to the second viewable bistable state. A similar marking array on the obverse side can be selectively or globally activated to erase the image.

Alternatively, erasure could be achieved in a secondary activation of the head by applying the magnetic field to the entire array while passing the ferrofluidic electric paper through the writing element 254 upside down.

Alternatively, as shown in FIG. 2, the ferrofluidic electric paper 100 or 300 could be written on using a hand-held writing instrument 256, such as a stylus with a magnetic head at the end of the stylus. Preferably, the stylus 256 would have a magnetic head 258 with a size of the print cells 110, such that the resolution of the ferrofluidic electric paper 100 or 300 matches the resolution of the writing instrument 256. However, for bolder writing, a larger magnetic head 258 could be provided that covers more than one print cell 110. As described above, the paper can be erased by passing the sheet over an array or fixed magnetic strip on the obverse side. Alternatively, rather than reversing the polarity, erasure can be achieved by passing the stylus 256 across the opposite side of the ferrofluidic electric paper 100 or 300.

Although the ferrofluidic electric paper 100 or 300 according to this invention has been described in detail above with respect to several preferred embodiments, various modifications can be implemented without departing from the spirit and scope of the invention.

For example, while primarily described with respect to a one-sided sheet of ferrofluidic electric paper 100 or 300, it is possible that the ferrofluidic electric paper 100 could be two-sided. In this case, the base substrate 112 or 312 would form another cover layer, and would need to be transparent and preferably be formed of the same material as the transparent cover layer 124 or 324. While, in this case, printing could be performed on either side, such printing would inherently form a reverse image on the reverse side.

Additionally, such a sheet of ferrofluidic electric paper 100 or 300 could be used for multi-color printing, as opposed to monochrome printing. This could be achieved, for example, by defining a 2×2 matrix of print cells, with one cell containing cyan fluid, one cell containing magenta fluid, one cell containing yellow fluid, and one cell containing black fluid. If the resolution is fine enough, the perceived color would be a proper mix of the 4 colors. Moreover, grayscale could be achieved by only partially filling the upper reservoir. This could be achieved by applying varying levels or times of magnetic force or other means to attain differentially filling one grayscale cell and/or differentially filling different colored cells. Color selectivity can be achieved by various means. The writing bar can locally sense ink color on the back side and create aligned magnetic actuation on the front side of the selected color cells. A 2-color (e.g., black and red on white) medium can be achieved by varying the cell or liquid parameters so that one color ink requires a higher field than the other to be pulled through its barrier. Only the low field ink, $I_{low}$ is written at low field, $B_{low}$. At high field, $B_{high}$, both $I_{low}$ and $I_{high}$ flow. To write just $I_{high}$, first $B_{high}$ is activated from the front, then $B_{low}$ is activated from the back.

Although the invention has been described in detail above with respect to several preferred embodiments, various modifications can be implemented without departing from the spirit and scope of the invention.

What is claimed is:

1. A bistable electric paper, comprising:

a base substrate layer;

a transparent cover layer; and an intermediate layer defining an array of print cells, each print cell including a first completely hidden reservoir adjacent the base substrate layer, a second visible reservoir adjacent the transparent cover layer and visible through the transparent cover layer, a passageway defined between the first completely hidden reservoir and the second visible reservoir shaped to prevent viewing of the completely hidden reservoir when looking through the transparent cover layer, and a ferrofluidic coloring fluid contained in one of the first completely hidden reservoir and the second visible reservoir, wherein a size of the passageway and at least one of a surface tension and a viscosity of the ferrofluidic coloring fluid are selected such that the ferrofluidic coloring fluid does not flow through the passageway absent an external magnetic driving force, but upon application of an external magnetic driving force near one of the base substrate layer and the cover layer, the ferrofluidic coloring fluid from each desired print cell is pulled by the external magnetic force from a farther one of the first hidden reservoir and the second visible reservoir through the passageway and into a nearer one of the first hidden reservoir and the second visible reservoir to form a desired viewable image in the electric paper.

2. The electric paper of claim 1, wherein absent an external magnetic driving force, the ferrofluidic coloring fluid is stably maintained in either the first completely hidden reservoir or the visible reservoir.

3. The electric paper of claim 1, wherein a surface of the intermediate layer facing the transparent cover layer is opaque.

4. The electric paper of claim 3, wherein the surface is white.

5. The electric paper of claim 1, wherein the intermediate layer is formed from a porous material having pores forming the passageway.

6. The electric paper of claim 5, wherein a lower extremity of the porous intermediate layer forms the first completely hidden reservoir.

7. The electric paper of claim 5, wherein an upper extremity of the porous intermediate layer forms the second visible reservoir.

8. The electric paper of claim 1, wherein the intermediate layer comprises:

a first layer adjacent the base substrate layer defining walls of the hidden reservoir;

a second layer above the first layer defining a top of the hidden reservoir and having a first aperture of a predetermined size;

a third layer above the second layer communicating with the aperture and defining a thickness of the passageway;

a fourth layer above the third layer defining a bottom of the visible reservoir and having a second aperture offset from the first aperture while communicating with the first aperture through the passageway; and a fifth layer between the fourth layer and the cover layer defining walls of the visible reservoir.

9. The electric paper of claim 8, further comprising at least one return passageway.

10. The electric paper of claim 1, wherein the print cells are substantially square.

11. The electric paper of claim 10, wherein the print cells form a matrix of between 50–300 cells per inch.

12. The electric paper of claim 1, wherein the ferrofluidic fluid contains iron oxide nano-particles dispersed therein.

13. The electric paper of claim 1, wherein the first completely hidden reservoir is at least as large volumetrically as the second visible reservoir.

14. The electric paper of claim 1, wherein when the first completely hidden reservoir contains the ferrofluidic coloring fluid, the second visible reservoir contains a transparent medium that is immiscible with the ferrofluidic coloring fluid.

15. The electric paper of claim 14, wherein the transparent medium is a gas.

16. The electric paper of claim 14, wherein the transparent medium is a clear liquid.

17. The electric paper of claim 1, wherein each layer of the electric paper is sealingly bonded to an adjacent layer.

18. The electric paper of claim 1, wherein the intermediate layer of the electric paper is die cut and laminated to an adjacent layer.

19. An electric paper writing system, comprising the electric paper of claim 1 and a magnetic writing instrument.

20. The electric paper writing system of claim 19, wherein the magnetic writing instrument is a fullwidth array of individually addressable magnetic elements corresponding in size to the size of the print cells.

21. The electric paper writing system of claim 19, wherein the magnetic writing instrument is a hand-held magnetic stylus.

22. A method of writing using a bistable electric paper having a base substrate layer, a transparent cover layer, and an intermediate layer defining an array of print cells, each print cell including a first completely hidden reservoir adjacent the base substrate layer, a second visible reservoir adjacent the transparent cover layer and visible through the transparent cover layer, a passageway defined between the first completely hidden reservoir and the second visible reservoir, and a ferrofluidic coloring fluid contained in one of the first completely hidden reservoir and the second visible reservoir, wherein a size of the passageway and at least one of a surface tension and a viscosity of the ferrofluidic coloring fluid are selected such that the ferrofluidic coloring fluid does not flow through the passageway absent an external magnetic driving force, but upon application of an external magnetic driving force near one of the base substrate layer and the cover layer, the ferrofluidic coloring fluid from each desired print cell is pulled by the external magnetic driving force from a farther one of the first completely hidden reservoir and the second visible reservoir through the passageway and into a nearer one of the first completely hidden reservoir and the second visible reservoir, comprising the steps of:

passing a magnetic writing instrument over at least one of the base substrate layer and the transparent cover layer; and selectively applying an external magnetic driving force to the electric paper during the step of passing to cause the ferrofluidic fluid in predetermined ones of the print cells to be pulled by the external magnetic driving force from a farther one of the first completely hidden reservoir and the second visible reservoir through the passageway and into a nearer one of the first completely hidden reservoir and the second visible reservoir to form a visible image through the transparent cover layer, wherein the visible image remains even upon removal of the magnetic force.

23. The method of claim 22, wherein the magnetic writing instrument includes an array of individually addressable magnetic elements corresponding in size to the print cells and the step of passing includes relatively passing the array past the electric paper.

24. The method of claim 22, wherein the magnetic writing instrument includes a hand-held magnetic stylus and the step of passing includes passing the stylus past the electric paper.

25. The method of claim 22, further comprising a step of erasing the visible image by relatively passing the base substrate layer of the electric paper by the magnetic writing instrument causing the ferrofluidic fluid in predetermined ones of the print cells to be pulled by the external magnetic driving force from the second visible reservoir through the passageway and into the first completely hidden reservoir, erasing at least a portion of the visible image.

26. The method of claim 25, wherein the external magnetic driving force is applied to all print cells of the array so that the visible image is completely erased.

27. A method for fabricating an electric paper, comprising the steps of:

providing a base substrate layer;

providing a transparent cover layer;

die cutting and laminating intermediate layers to adjacent layers, including the base substrate layer and the transparent cover layer, to define an array of print cells, each print cell including a first hidden reservoir adjacent the base substrate layer, a second visible reservoir adjacent the transparent cover layer, and a passageway defined between the hidden reservoir and the visible reservoir;

filling one of the hidden reservoir and the visible reservoir for each print cell with a ferrofluidic coloring fluid having a predetermined surface tension and viscosity; and sealing the print cells, wherein a size of the passageway is selected based on at least one of the surface tension and the viscosity of the ferrofluidic coloring fluid such that the ferrofluidic coloring fluid does not flow through the passageway absent an external magnetic driving force, but upon application of an external magnetic driving force near one of the base substrate layer and the cover layer, the ferrofluidic coloring fluid from each desired print cell is pulled by the external magnetic force from a farther one of the first hidden reservoir and the second visible reservoir through the passageway and into a nearer one of the first hidden reservoir and the second visible reservoir to form a desired viewable image in the electric paper.

28. The method of claim 27, wherein the step of die cutting and laminating intermediate layers comprises:

die cutting a first intermediate layer to define walls of the hidden reservoir and laminating the first intermediate layer to the base substrate layer;

die cutting a second intermediate to have a first aperture of a predetermined size and laminating the second intermediate layer to the first intermediate layer to define a top of the hidden reservoir;

die cutting a third intermediate layer to define a thickness of the passageway and laminating the third intermediate layer to the second intermediate layer;

die cutting a fourth intermediate layer with a second aperture and laminating the fourth intermediate layer to the third intermediate layer to define a bottom of the visible reservoir and with the second aperture in fluid communication with the first aperture through the passageway; and die cutting a fifth intermediate layer and laminating the fifth intermediate layer between the fourth intermediate layer and the transparent cover layer to define walls of the visible reservoir.

29. The method of claim 27, wherein the step of filling is performed by passing one of the hidden reservoir and the visible reservoir of each print cell past an inking roller prior to lamination of the intermediate layers with both of the base substrate layer and the transparent cover layer to fill the one reservoir of each print cell with ferrofluidic coloring fluid.

30. The method of claim 27, wherein the step of filling is performed by passing one of the hidden reservoir and the visible reservoir of each print cell past a ferrofluidic coloring fluid ejector prior to lamination of the intermediate layers to both of the base substrate layer and the transparent cover layer.

31. The method of claim 27, wherein one of the intermediate layers is formed from a porous material defining the passageway.

32. The method of claim 27, wherein the laminated electric sheet is cut to a desired final size.

* * * * *